United States Patent [19]

Barnes et al.

[11] 3,996,085
[45] Dec. 7, 1976

[54] TUBE-TIRE PATCH AND METHOD AND APPARATUS FOR APPLYING SAME

[75] Inventors: Dwaine R. Barnes, Gladstone, Oreg.; Marvin E. Beyers, Peoria; Donald G. Boundy, East Peoria, both of Ill.; Robert W. Untz, Hanna City; Robert M. Wilcox, Minonk, both of Ill.

[73] Assignee: Caterpillar Tractor Co., Peoria, Ill.

[22] Filed: May 5, 1975

[21] Appl. No.: 574,820

[52] U.S. Cl. .............................. 156/97; 152/367; 152/370
[51] Int. Cl.² .......................................... B29H 5/16
[58] Field of Search ............... 156/94, 95, 97, 98, 156/394; 152/367–372; 51/168

[56] References Cited
UNITED STATES PATENTS

| | | | |
|---|---|---|---|
| 733,014 | 7/1903 | Cox | 152/370 |
| 2,974,715 | 3/1961 | Soares et al. | 152/370 |
| 3,039,509 | 6/1962 | Gruber | 156/95 UX |
| 3,648,750 | 3/1972 | Felden | 152/370 |
| 3,849,941 | 11/1974 | Barnes | 51/168 |

FOREIGN PATENTS OR APPLICATIONS

| 1,239,953 | 5/1967 | Germany | 152/367 |
|---|---|---|---|

*Primary Examiner*—William A. Powell
*Assistant Examiner*—John E. Kittle
*Attorney, Agent, or Firm*—Phillips, Moore, Weissenberger Lempio & Strabala

[57] ABSTRACT

The invention comprises a tube-tire patch, and a method and apparatus for applying said patch. The patch comprises a cured rubber member with a concave surface internally reinforced with a fabric and having a stem integral with said member and upraised generally centrally from said concave surface. The patch includes an uncured rubber layer covering the concave surface and a removable protective cover generally coextensive with the concave surface and fully covering the uncured rubber layer. The patch is especially useful for patching a punctured tube-tire. A tube-tire patch as described above is inserted through the puncture after appropriate buffing and cleaning about the puncture with the stem portion of the patch extending through the puncture. The protective cover is removed from the concave surface through the puncture and thereafter a pulling force is exerted upon the stem and away from the puncture. A pressurized fluid such as air or steam is passed into and out of the tube-tire while a band is generally maintained about the outer circumference of the tube-tire and support, generally in the form of two bands, is generally maintained against the inner circumference thereof. Heat is generally applied to the patch to quickly cure the uncured rubber layer and thereby form a strong and effective patch. The heat can preferably be applied internally as by using steam as the pressurized fluid and/or externally as by using a heated pad clamped onto the tire over the patch.

12 Claims, 9 Drawing Figures

U.S. Patent  Dec. 7, 1976  Sheet 1 of 2  3,996,085
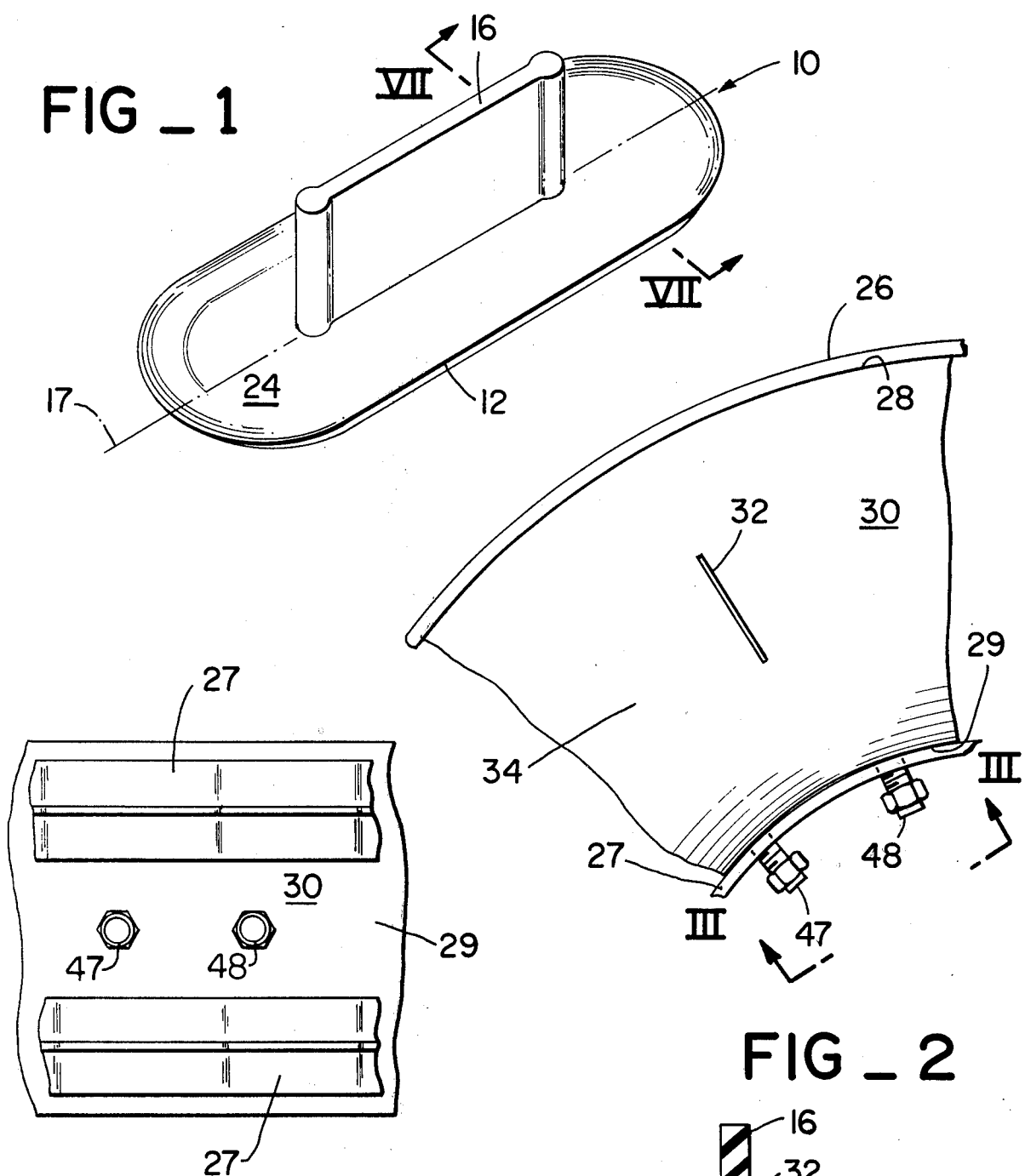
FIG_1
FIG_2
FIG_3
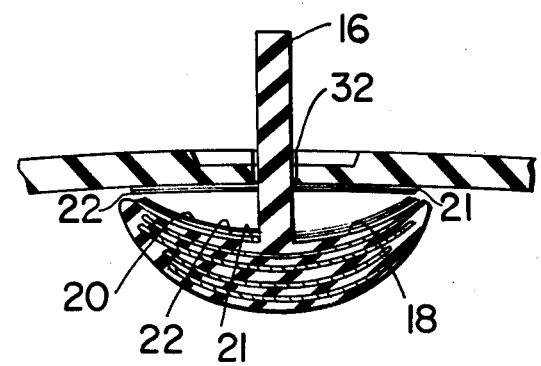
FIG_4

U.S. Patent  Dec. 7, 1976  Sheet 2 of 2  3,996,085
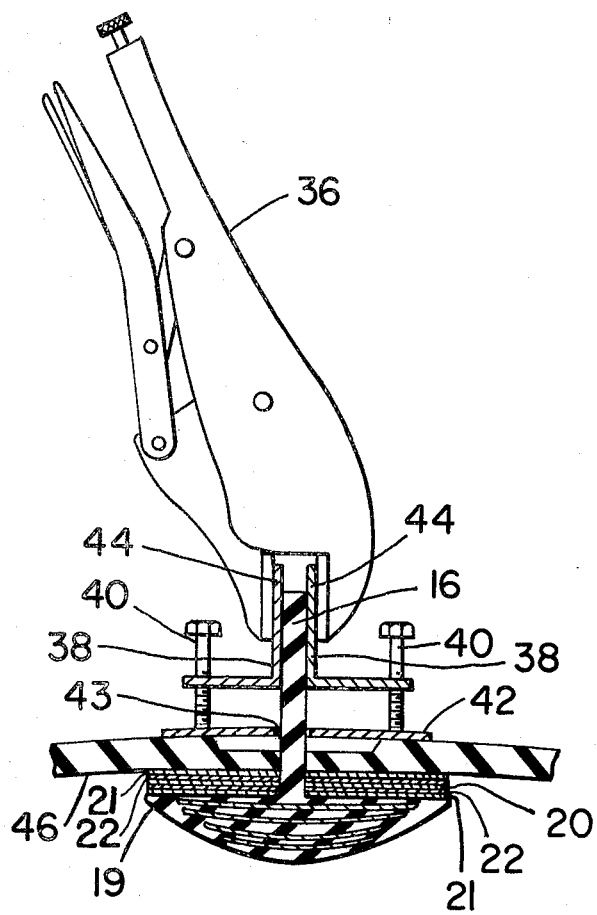
FIG_5
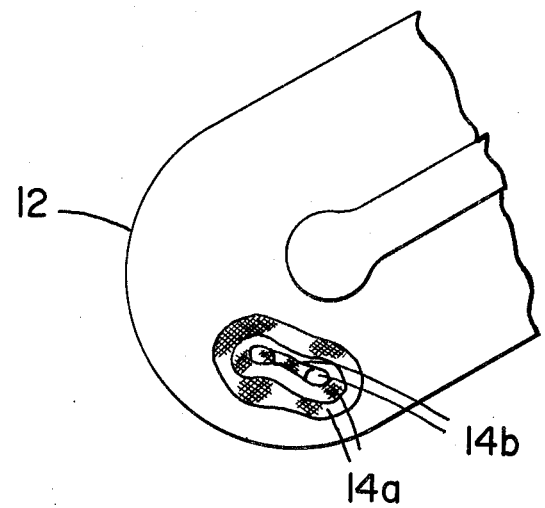
FIG_6
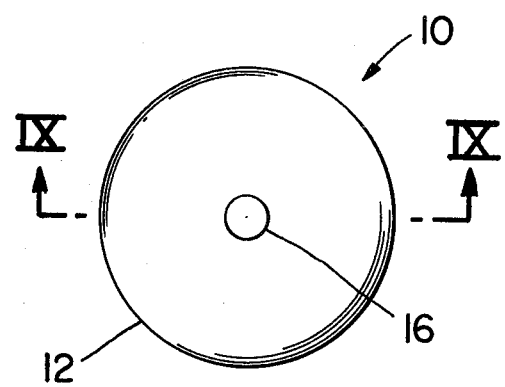
FIG_8
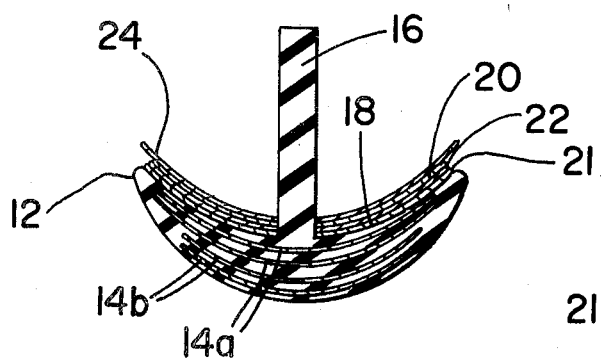
FIG_7
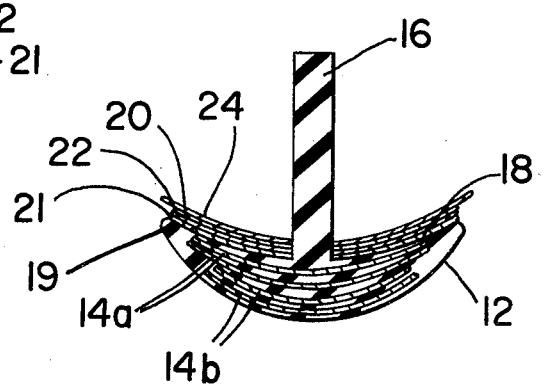
FIG_9

TUBE-TIRE PATCH AND METHOD AND APPARATUS FOR APPLYING SAME

BACKGROUND OF THE INVENTION

1. Field of the Invention

The invention relates to a patch which is especially useful for patching punctures in tube-tires and to a method of patching punctures in tube-tires utilizing said patch. A tube-tire is a tire in the form of a complete hollow torus and generally includes a removable tread belt about the outer circumference thereof. Such tires are described, for example, in U.S. Pat. No. 3,606,921.

2. Prior Art

The prior art teaches any number of patches of any number of shapes for repairing punctures in normal rim (or beaded) type tires wherein both the interior of the tire and the exterior of the tire are accessible. Typical mushroom shaped prior art patches are described, for example, in German Auslegeschrift No. 1,505,121 and in U.S. Pat. No. 2,668,570. With rim type tires, it is possible to apply a flat patch, for example, on the interior of the tire, by simply properly preparing the interior surface of the tire by buffing it, cleaning it and coating it with uncured rubber and then clamping the patch as with a C-clamp or the like from the interior of the tire up against the puncture which is being repaired and directly heating the patch as with a heated electric pad or the like until the uncured rubber is cured. With tube-tires a special problem arises, namely that the interior of the tire is not availabe for easy access to place a patch against and through the puncture. Also it is not possible without breaking open the tire to place, for example, a heated pad, or the like, inside the tire and up against a patch to hasten and complete curing or sealing of the patch against the interior tire wall.

Accordingly, it is an object of the present invention to provide an improved tube-tire patch which is insertable through a puncture in a tube-tire from the exterior of the tube-tire and upon which pressure can be exerted from exteriorly of the tube-tire.

It is a further object of the invention to provide a method of patching a puncutured tube-tire by pressurizing the air chamber of the tube-tire with fluid after a patch has been inserted through a puncture therein and has been pulled upon from exteriorly of the tire to evenly exert sealing pressure on the patch during a cure period of sufficient duration to establish a tight, permanent bond between the patch and the interior of the tire.

These and other objects of the invention are achieved as described in the following:

SUMMARY OF THE INVENTION

In one sense the invention comprises a tube-tire patch, comprising a cured rubber member with a concave surface internally reinforced with a fabric and having a stem integral with the member and upraised generally centrally from the concave surface thereof. The patch further includes an uncured rubber layer covering the concave surface and a removable protective cover generally coextensive with the concave surface and covering the uncured rubber layer, the protective cover serving to allow the patch to be inserted through a puncture while protecting the patch from becoming stuck to the stem thereof and to protect the concave surface from becoming stuck, one part to another.

In another sense the invention comprises a method and apparatus for patching a punctured tube-tire. The method comprises maintaining a band about the outer circumference and support against the inner circumference of the tube-tire to provide sufficient rigidity thereto to maintain the tire in its proper arcuate configuration and inserting a tube-tire patch, as just described above, through the puncture of the tire. The method further comprises removing the protective cover from the uncured rubber layer within the tube-tire, exerting a pulling force upon the stem away from the puncture and pressurizing the air chamber of the tube-tire for a time sufficient to cure the uncured rubber layer. Before the patch is inserted through the puncture all damaged rubber is removed from the sidewall of the tire down to the wire reinforcement.

Apparatus is disclosed for carrying out the above-described patching method.

BRIEF DESCRIPTION OF THE DRAWINGS

The invention will be better understood by reference to the drawings in the figures of which like numbers denote like parts throughout and wherein:

FIG. 1 illustrates a preferred embodiment of the invention in perspective view.

FIG. 2 illustrates a partial view of a banded tube-tire with a puncture therein and including inlet and outlet ports for pressurizing the air chamber of the tire.

FIG. 3 illustrates a view taken from the plane III — III of FIG. 2.

FIG. 4 illustrates in partial side section view a puncture in a tube-tire with a patch of the invention inserted therethrough with the protective cover removed and ready to be clamped in place from exteriorly of the tire.

FIG. 5 illustrates in partial side section view a puncture in a tube-tire with a patch of the invention clamped in place.

FIG. 6 illustrates a partial top cut-away view of the patch of the invention showing fabric reinforcement thereof.

FIG. 7 illustrates a view taken from the plane VII — VII of FIG. 1.

FIG. 8 illustrates in top view an alternate embodiment of the patch of the present invention.

FIG. 9 illustrates a view taken from the plane IX — IX of FIG. 8.

DETAILED DESCRIPTION OF THE PREFERRED EMBODIMENT

The tube-tire patch of the present invention is shown in FIG. 1 and is indicated generally by the numeral 10. The patch 10 includes a concave surfaced cured rubber member 12 which is integrally reinforced with a fabric, preferably a plurality of fabric layers 14a and 14b, as shown in FIGS. 6, 7 and 9. A stem 16 is upraised from the concave surface 18 of the cured rubber member 12 and more particularly is upraised generally centrally therefrom along a longer axis 17 thereof. The shape of the patch 10 and more particularly the provision of a linearly extending stem 16 along the longer axis 17 of the patch 10 makes the embodiment of the patch 10 illustrated in FIGS. 1 and 7 particularly useful for patching linearly extending punctures while the concave nature of the surface 18 assures, as will become apparent in following, a mating fit of said surface 18 to form a correctly contoured leak-proof cured patch. The concave surface 18 is preferably smooth to allow and aid in the formation of a leak-proof cured patch.

The layer or layers 14a nearest the surface 18 are larger than the layer or layers 14b and extend closer to the periphery 19 of the member 12 to provide needed rigidity thereto.

As is shown most clearly in FIGS. 4, 7 and 9, the patch includes an uncured rubber layer 20 adjacent and generally coextensive with the concave surface 18. Generally a rubber based adhesive 21 which usually comprises uncured natural rubber and a solvent therefor is included in direct contact with the surface 18 followed by a curing layer 22 of uncured natural rubber, a solvent therefor and a curing accelerator and then the uncured rubber layer 20. Typical solvents would be any of a number of organic solvents, e.g. trichloroethylene, perchlorobenzene, monochlorobenzene, toluene, propylene dichloride, methylethyl ketone or the like.

As is well known in the art the proper curing of uncured rubber to cured rubber to form an air tight bond requires the use of a dried rubber based adhesive 21 upon the uncured rubber followed by a dried curing layer 22 of uncured rubber plus solvent with a curing accelerator therein. Typical commerical rubber based adhesive is available under the trademark "Patch Fast Cement" from the Patch Rubber Company, Akron, Ohio and typical uncured rubber plus solvent plus curing accelerator is available under the trademark "Chemical Vulcanizing Fluid" from the same supplier. Hughson Chemical Company of Erie, Pennsylvania supplies products trademarked "TS 701-63" and "TS 701-62" for similar uses. A removable protective cover 24 at least coextensive with or more usually larger than the uncured rubber layer 20 is placed over and covers said uncured rubber layer 20.

PROCESS

The method in which the just described tube-tire patch is used is illustrated most clearly in FIGS. 2, 3, 4 and 5 and is as follows:

First a rigid band 26 is maintained about the outer circumference 28 and one or more rigid bands 27 (usually two bands 27) are placed in supportive contact with the inner circumference 29 as illustrated in FIG. 2, of a tube-tire 30. As an alternate procedure, the rigid band 26 maintained about the outer circumference 28 of the tube-tire 30 can comprise the tread belt which surrounds the outer circumference 28 and has the tread thereon and the rigid bands maintained against the inner circumference of the tube-tire 30 can comprise the rim on which the tube-tire 30 is mounted to a vehicle. Thus, the tube-tire 30 can be repaired in accordance with the present invention even while still remaining mounted on a vehicle. The bands 26 and 27 provide backing strength which holds the tire to its shape during pressurization as with air or steam to effect curing of the patch 10 to the inside of the tire adjacent a puncture 32. Damaged sidewall rubber is removed in the puncture area. The interior of the tube-tire 30 adjacent the puncture 32 in a sidewall 34 of the tube-tire 30 is cleaned and roughened using a suitable buffing tool such as that taught in U.S. Pat. No. 3,849,941, inserted through the puncture 32. Then the rubber adhesive 21 is coated internally of the tube-tire 30 adjacent the puncture 32 through said puncture 32 using an appropriate roller tool similar to a small paint roller or the like and allowed to dry, generally for at least about 10 minutes. Next, a curing layer 22 of uncured rubber plus solvent plus curing accelerator is coated onto the adhesive 21 by inserting a roller tool or the like through the puncture 32. The curing layer is generally dried for at least 1 minute. Then, the patch 10 is inserted through the puncture 32 and the protective cover is removed through the puncture 32, as by a pair of pliers, forceps, tweezers or the like; the patch 10 is pulled up by the stem 16 thereof, as illustrated most clearly in FIG. 5; and clamped in place as, for example, using a vise grip 36 which has been modified as by welding or the like to include a pair of L-shaped base members 38 through which bolt holes for a plurality of bolts 40 pass. A metal plate 42, shaped to conform to the tire exterior and having an opening 43 to pass the stem 16 is generally placed over the puncture 32 so as to protect the tire from injury by the bolts 40 and to provide good leverage for pulling upwardly upon the stem 16. The vise grip 36 is tightened sufficiently to cause the L-shaped base members 38 to grasp the stem 16 between the vertical legs 44 thereof. When the stem 16 is first pulled upwardly, the outer periperhy 19 of the member 12, is the first part of the patch to contact the curved interior 46 of the tube-tire 30. Then, as more pressure is progressively applied to the stem 16, the rest of the concave surface 18 contacts the curved interior 46 of the tire 30 progressively inwardly towards the stem 16. In this manner it is assured that a complete and uniform mating of the smooth concave surface 18 of the patch (which is converted by the pressure upon the stem 16 to a convex surface 18) with the curved interior 46 of the tube 30 is accomplished. The use of a pluraltiy of fabric layers 14a and 14b, with the larger layers 14a being closer to the surface 18, provides sufficient rigidity to the member 12 so that said member 12 is not overly inverted whereby the periphery 19 thereof would lose contact with the interior 46 of the tube-tire 30 as with less rigid mushroom shaped patches.

After the patch has been clamped in place under pressure, a pressurized fluid such as air or steam is passed into and out of the air chamber of the tube-tire 30 as illustrated in FIGS. 2 and 3 via the ports 47 and 48. Generally, the interior air chamber of the tube-tire 30 is pressurized to about 10 psig. Curing is accelerated if steam is used as the pressurizing fluid. If desired, steam can be used for partial curing followed by air with or without application of heat, as by a heated pad placed exteriorly of the tube-tire 30 against the puncture 32. The use of two rigid bands 27 gives shape holding support along the inner circumference of the tube-tire while still providing access to the ports 47 and 48. The internal pressurization of the tube-tire 30 serves to maintain even pressure on the concave surface of the patch 10 to augment the pulling force exerted on the stem 16 during the curing of the uncured rubber layer thereby assuring a complete mating bond between the curved interior of the tube-tire 30 and the concave surface 18 of the patch 10, which surface 18 is converted into a convex surface by the combined pulling upon stem 16 and internal pressurization. The use of a heated fluid such as pressurized steam serves to more quickly cure the rubber layer. After curing, layers of uncured rubber, generally with holes cut out to pass the stem 16 are fit over the puncture with appropriate use of rubber based adhesive, etc. The stem is then generally cut off flush with the top of the rubber layers but below the exterior surface of the tube-tire 30 and a final coating of uncured rubber is used to fill in the remaining cavity. Curing of the uncured rubber leads to a completely repaired tube-tire 30.

The patch and method and apparatus for applying same of the present invention is also useful for the repair of punctures through the outer circumference 28 of the tube-tire 30. In such a situation, the tire belt is removed and repair proceeds as with sidewall punctures. Then, the belt is generally replaced and serves as a band about the outer circumference 28 of the tube-tire 30 during pressurization thereof.

When there is cable damage to the tire, a commercially available cable patch may be applied over the tube-tire reinforcing cables in the puncture area after cutting off the protruding portion of the stem 16. A cable patch includes a number of cables therein and is made of cured rubber. The cable patch is cured into place using at least two layers of rubber based adhesive and a layer of uncured rubber over the cables, then applying the cable patch which has rubber based adhesive on both sides thereof over the uncured rubber layer and stitching down the cable patch. Thereafter, the wound area over the cable patch is filled with uncured rubber and the entire repair area is cured using, e.g. pressurized steam inside the tire and a heated pad over the exterior repair area.

The removable protective cover 24 can be any material which will not permanently bond to the uncured rubber. Paritcularly useful materials in this regard are the polyolefins such as for example polyethylene and polypropylene, although of course a number of other materials are also suitable for such use as will be apparent to those skilled in the art.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. A tube-tire patch, comprising:
    an internally reinforced cured rubber member having a generally smooth concave surface and having internally thereof a plurality of fabric layers generally parallel to said concave surface;
    a stem integral with said member and upraised generally centrally from said concave surface;
    an uncured rubber layer covering said concave surface; and
    a removable protective cover generally at least coextensive with said concave surface and covering said uncured rubber layer.

2. A tube-tire patch as in claim 1, wherein at least one of said plurality of fabric layers nearer said concave surface extends closer to the periphery thereof than at least one of said pluraltiy of fabric layers farther from said concave surface.

3. A patch as in claim 1 including between said concave surface and said uncured rubber layer, a rubber based adhesive, and further including, intermediate said rubber based adhesive and said uncured rubber layer, a curing layer comprising natural rubber, a solvent therefor and a curing accelerator.

4. A tube-tire patch as in claim 1 in combination with means for exerting a pulling force upon said stem after said concave surfaced cured rubber member has been inserted through the puncture of the tire.

5. A method of patching a punctured tube-tire, comprising:
    inserting an internally reinforced concave surfaced rubber member having a stem upraised generally centrally from said concave surface, an uncured rubber layer covering said concave surface, and a removable protective cover over said uncured rubber layer through said puncture while retaining said stem extending through said puncture;
    removing said protective cover;
    exerting a pulling force upon said stem away from said puncture;
    maintaining a band about the outer circumference of the tube-tire and at least one rigid band about the inner circumference thereof;
    pressurizing said tube-tire to cause it to assume its proper curved running configuration with an outwardly curved interior; and curing said uncured rubber layer and thereby bonding said concave surface to the interior of said tube-tire.

6. A method as in claim 5 including as an added step prior to said inserting step, coating the interior of said tire adjacent said puncture with a dried layer of a rubber based adhesive and with a dried curing layer comprising natural rubber, a solvent therefor and a curing accelerator.

7. A method as in claim 6, wherein said rubber member includes intermediate said concave surface and said uncured rubber layer, a dried layer of a rubber based adhesive and further includes intermediate said rubber based adhesive and said uncured rubber layer, a dried curing layer comprising natural rubber, a solvent therefor and a curing accelerator.

8. A method as in claim 7, including, as an added step prior to said coating step, buffing and cleaning the interior surface of said tube-tire adjacent said puncture.

9. A method as in claim 8, including as added steps after said pressurizing cutting off the portion of said stem protruding through said puncture.

10. A method as in claim 9, wherein said pressurizing comprises passing a heated fluid, under pressure, into said tube-tire.

11. An apparatus useful for patching a tube-tire with an internally reinforced concave surfaced rubber patching member having a stem upraised generally centrally from said concave surface, an uncured rubber layer covering said concave surface and a removable protective cover over said uncured rubber layer, said patching member being inserted in a puncture in said tube-tire with said stem extending through said tube-tire to external of said puncture, comprising:
    a rigid band placable in tight fitting relation about the outer circumference of the tube-tire;
    at least one rigid band placable in tight fitting relation against the inner circumference of the tube-tire;
    a plate shaped to conform to the exterior of the tube-tire fitable over said puncture, said plate including an opening therethrough through which said stem can pass;
    means for clamping onto said stem;
    means for pushing said clamping means away from said plate and thereby exerting a pulling force upon said stem after said protective cover is removed interiorly of said tube-tire from said patching member means for passing a pressurized fluid into said tube-tire to cause the interior thereof to assume its proper outwardly curved running configuration shape; and means for curing said uncured layer and thereby bonding said concave surface to the interior of said tube-tire.

12. An apparatus as in claim 11, wherein said curing means comprises means for heating said pressurized fluid.

* * * * *